E. L. DUNN.
BOLT RECLAIMING MACHINE.
APPLICATION FILED NOV. 29, 1919.
1,374,723.
Patented Apr. 12, 1921.
4 SHEETS—SHEET 1.
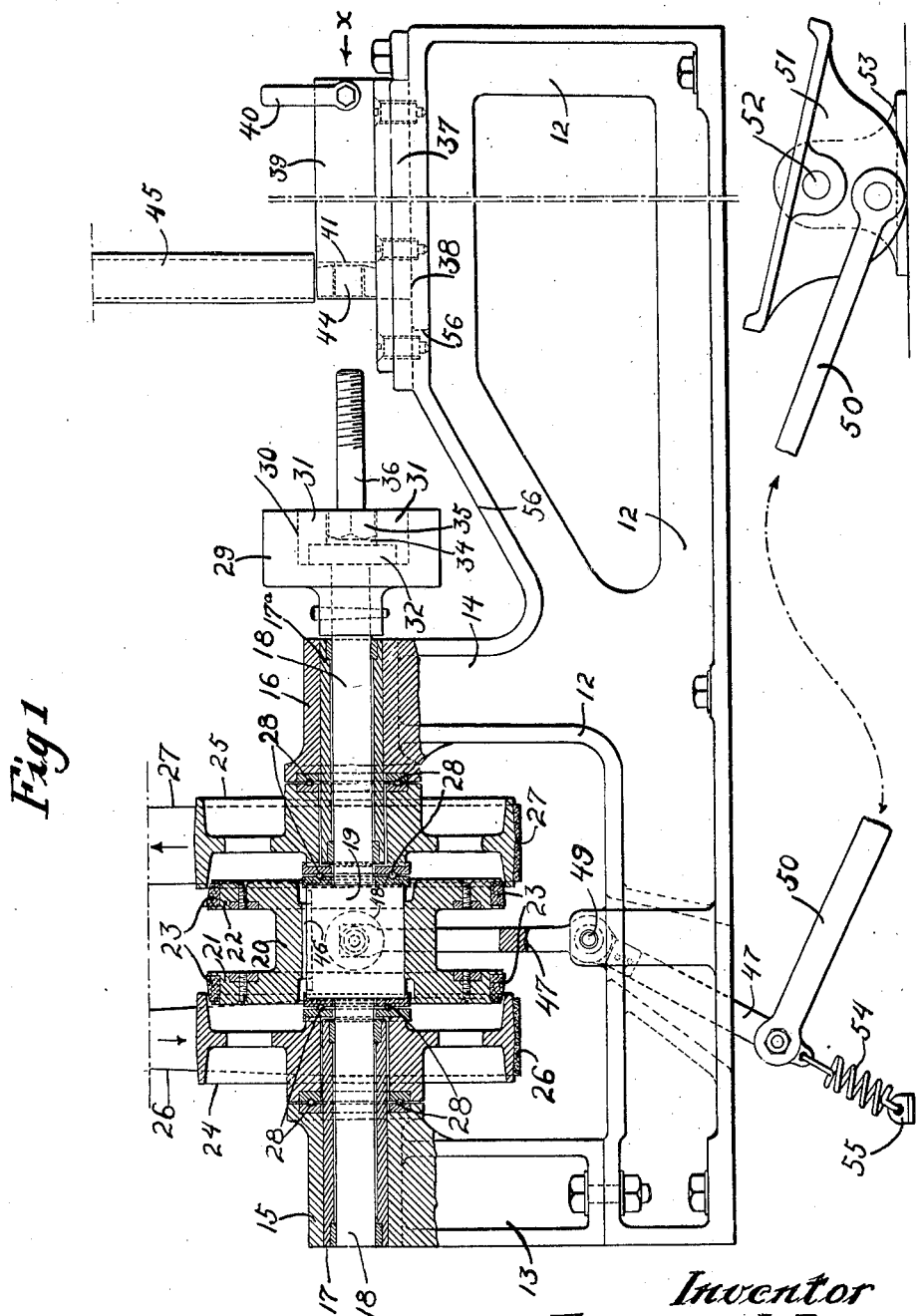
Witnesses
Geo. A. Gruss
Augustus B. Coppes
Inventor
Edmund L. Dunn
By Joshua R. H. Potts
his Attorney

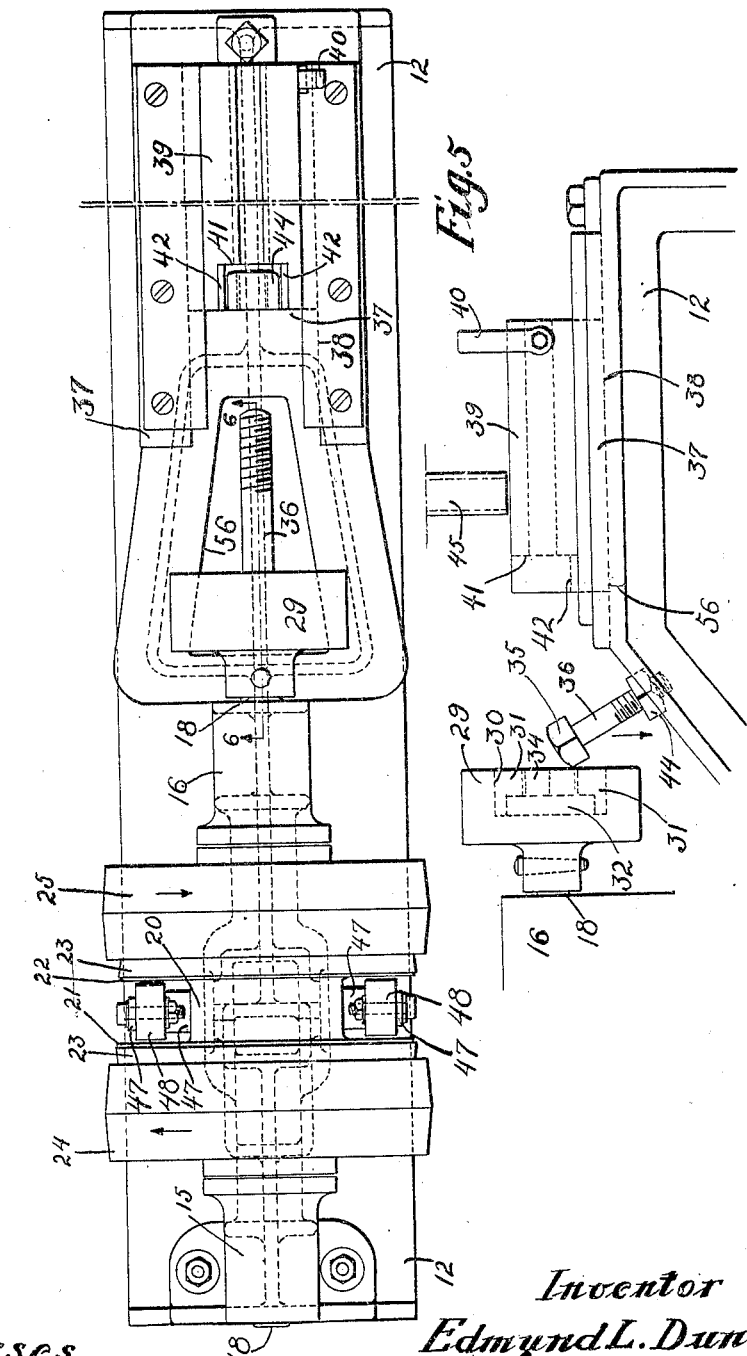

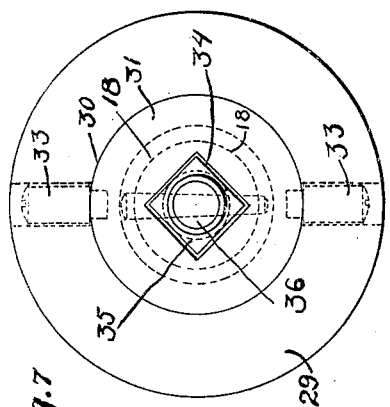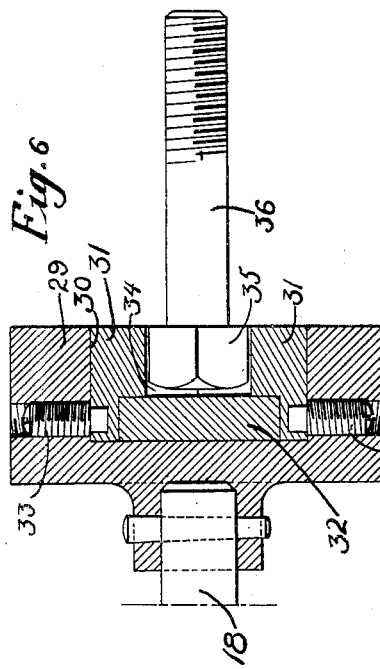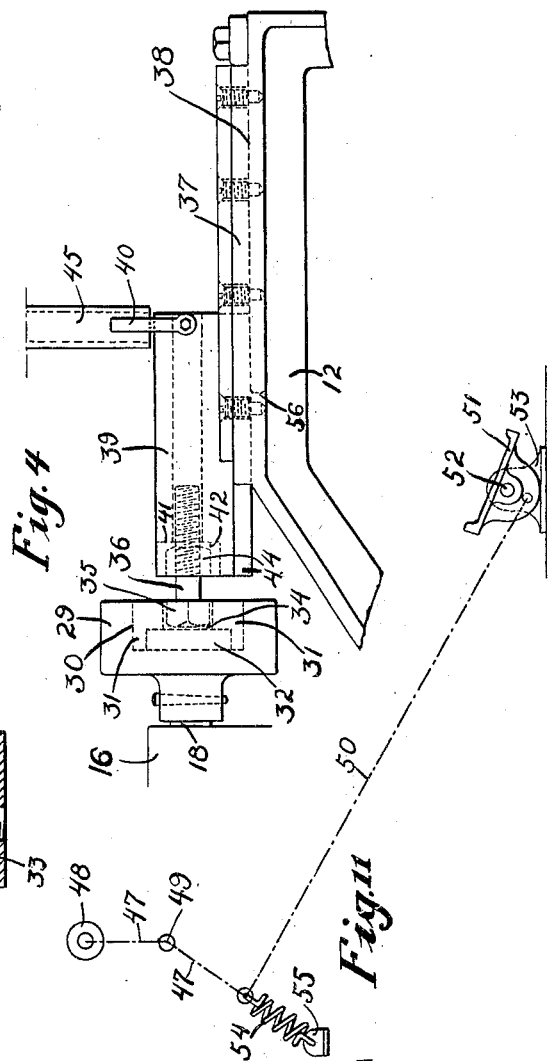

E. L. DUNN.
BOLT RECLAIMING MACHINE.
APPLICATION FILED NOV. 29, 1919.
1,374,723.
Patented Apr. 12, 1921.
4 SHEETS—SHEET 4.
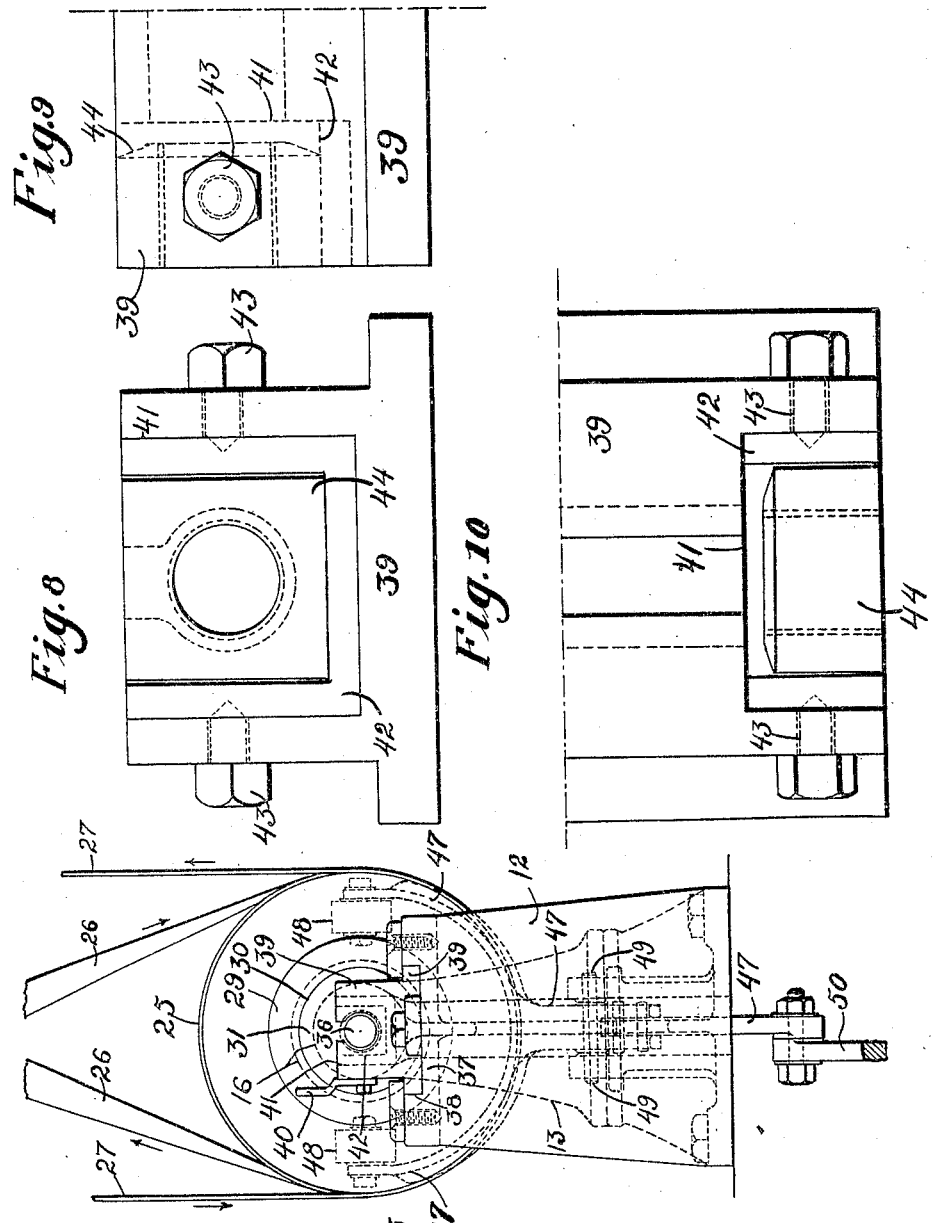
Witnesses
Geo. A. Gruss
Augustin B. Copper
Inventor
Edmund L. Dunn
By Joshua R.H. Potts
his Attorney

UNITED STATES PATENT OFFICE.

EDMUND LOUIS DUNN, OF PHILADELPHIA, PENNSYLVANIA, ASSIGNOR OF ONE-THIRD TO JAMES P. SALMON AND ONE-THIRD TO EDMUND D. FITZPATRICK, BOTH OF PHILADELPHIA, PENNSYLVANIA.

BOLT-RECLAIMING MACHINE.

1,374,723.      Specification of Letters Patent.      Patented Apr. 12, 1921.

Application filed November 29, 1919. Serial No. 341,451.

*To all whom it may concern:*

Be it known that I, EDMUND L. DUNN, a citizen of the United States, residing at Philadelphia, in the county of Philadelphia and State of Pennsylvania, have invented certain new and useful Improvements in Bolt-Reclaiming Machines, of which the following is a specification.

It is well known that great numbers of bolts are often discarded and wasted due to the fact that they readily rust and workmen do not care to go to the trouble to use these rusted bolts for the reason that it is nearly impossible to turn the nuts and so the bolts are discarded as above stated. This is especially true where bolts are used for out-door erecting places, such for example in shipyards where large quantities of bolts are employed for securing the plates and various parts of the ship together and these bolts remain in place until the riveters remove them for the purpose of substituting rivets. It is quite obvious that where millions of these bolts are used and exposed to the elements that there is great loss when the bolts are discarded as above described.

One of the objects of my invention is to provide a machine which will reclaim and thereby re-fit the rusted bolts so that they can be used again.

Another object is to so construct my improved machine that nuts can be readily applied to the bolts and if desired can be permitted to remain on the bolts after the bolts have been reclaimed.

Another object is to so construct my improved machine that it can be easily and quickly manipulated and can be readily adjusted to suit bolts of various sizes.

A still further object is to make my invention of a strong and durable construction capable of withstanding hard usage.

These objects, and other advantageous ends which will be described hereinafter, I attain in the following manner, reference being had to the accompanying drawings in which—

Figure 1 is a side elevation of my invention showing a portion in central vertical section, Fig. 2 is a top plan view of Fig. 1, Fig. 3 is an end elevation looking in the direction of the arrow $x$ in Fig. 1, Fig. 4 is a fragmentary elevation showing certain of the parts having been moved from their position as shown in Fig. 1 and illustrating one step of the operation of the machine, Fig. 5 is a view of similar nature to Fig. 4 showing certain of the parts moved into another position and illustrating another stage of the operation of the machine, Fig. 6 is an enlarged fragmentary section taken on the line 6—6 of Fig. 2, Fig. 7 is an end elevation of Fig. 6, Fig. 8 is an enlarged end elevation of certain of the features of my invention, Fig. 9 is a fragmentary side elevation of Fig. 8, Fig. 10 is a fragmentary top plan view of Fig. 8, and Fig. 11 is a diagrammatic view showing certain of the controlling elements which form a part of my invention.

Referring to the drawings, 12 represents the frame of my improved machine including two standards 13 and 14 which have bearings 15 and 16 at their tops. Bushings 17 and 17$^a$ are respectively fitted within the bearings 15 and 16 and serve to support portions of a shaft 18; said shaft having an enlarged portion 19 intermediate the bushings 17 and 17$^a$, as clearly shown in Fig. 1. A clutch member 20 has flanges 21 and 22 provided with friction rings 23.

Two pulleys 24 and 25 are freely rotatable on the bushings 17 and 17$^a$ between the bearings 15 and 16 and at opposite sides of the clutch member 20, the pulleys 24 and 25 are driven in opposite directions from any suitable source of power and as illustrated the pulley 24 has a crossed belt 26 serving to drive it and the pulley 25 is driven by a straight belt 27. Thus both of these pulleys can be operated in opposite directions from an overhead shaft (not illustrated).

Thrust bearings 28 are provided at opposite sides of the pulleys 24 and 25 and one end of the shaft 18 is provided with a chuck 29; said chuck having a recess 30 in which is placed a block 31 and abutment plate 32, as clearly shown in Figs. 6 and 7. The block 31 is secured in place by set screws 33 and the abutment plate 32 is fitted between the rear end of the block 31 and the innermost face of the recess 30. The block 31 has a hole 34 providing a cavity which is made angular so as to receive and conform to the heads 35 of the bolts 36. By the above construction, blocks 31 having holes 34 of different sizes and shapes can be inserted within the recess 30 according to the character or class of the bolts which are to be operated upon.

The forward end of the frame 12 has a bed 37 which provides a channel 38 forming a slideway for a carriage 39; said carriage being adapted to be moved toward and from the chuck 29 and as illustrated I have provided said carriage with a handle 40 whereby the carriage can be manually moved. The end of the carriage 39 nearest the chuck 29 has a recess 41 and within this recess 41, a socket 42 is secured by set screws 43. The socket 42 is made angular in cross section and is adapted to receive, through the lateral opening in its top, nuts 44 which are to be applied to the bolts while the latter are within the chuck 29. As illustrated, I have provided a chute 45 through which the nuts 44 can be successively fed into the socket 42 in a manner hereinafter described although I wish it understood that if desired the chute 45 can be eliminated and the nuts can be placed in the socket 42 by hand. By providing the recess 41 with the socket 42, the latter can be readily removed in the same manner as the block 31 if it is desired to change from one class of nuts to another.

The clutch member 20 is slidably keyed as shown at 46 to the enlarged portion 19 of the shaft 18 and it will be noted that when the friction rings 23 are moved in opposite directions alternately into engagement with the pulleys 24 and 25 that the shaft 18 and consequently the chuck 29 will be rotated in opposite directions. I have illustrated a device for moving said clutch member so as to effect rotation of the clutch 29 in opposite directions, said device including a bifurcated arm 47 having rollers 48 at its upper end adapted to engage between the flanges 21 and 22 of the clutch member 20. The arm 47 is pivoted at 49 and has its lower end connected to a link 50; said link also being connected to a treadle 51 which is pivoted at 52 to a supporting structure 53 which may be placed close to the floor. A coiled spring 54 has one end attached to the lower end of the arm 47 and its other end attached to a fixed supporting structure 55; the normal position of said spring, as shown in Fig. 1, being in a straight line from support 55 to the pivot 49 so as to hold and always return the rollers 48 in their normal positions with the clutch out of engagement with the pulleys 24 and 25. It will thus be understood that when the treadle 51 is swung on its pivot 52 in one direction that it will operate to move the clutch member 20 in one direction and when the treadle 51 is moved in an opposite direction, the clutch member 20 will be moved in an opposite direction; the spring 54 always serving to return the clutch member to its normal position when the treadle 51 is released.

Considering that the bolts 36, prior to being placed in the chuck 29, are rusty and that their screw threads have been rusted to such extent that it is practically impossible for a man to turn a nut thereon, said bolts are successively placed with their heads within the cavity 34 of the block 31 with their threaded stems extending toward the carriage 39. The nut 44 is fed into the socket 42 and the carriage is moved toward the bolt 36. At the same time the operator places his foot upon the treadle 51 and swings the latter in a direction so as to effect the turning of the chuck 29 and bolt 36 in a direction to cause the threaded end of the bolt to enter the nut 44 when the carriage 39 reaches such forward position. The operator continues to move the carriage 39 forwardly and due to the power exerted upon the shaft 18 through the medium of the clutch member 20, the nut can be run onto the bolt and in so doing cleans and strips the rust from the threads of the bolt, such position being shown in Fig. 4. After this position has been reached, the operator reverses the movement of the treadle 51 to cause the chuck 29 to be rotated in an opposite direction so as to turn the bolt 36 in the opposite direction. This action will cause the nut 44 to be moved rearwardly together with the carriage 39 from the position shown in Fig. 4 to the position shown in Fig. 5. If it is desired to permit the nut to remain upon the bolt close to the outer end of the screw threaded stem, the treadle 51 can be released and a slight rear movement of the carriage 39 after thus releasing the treadle 51 will permit the bolt with the nut thereon to fall out of the chuck 29 into any suitable receptacle and for this purpose I have illustrated the frame 12 with an aperture 56, as clearly shown in Fig. 2 so that the bolts can drop through the frame.

It will thus be understood that my invention serves in two capacities. It causes the threaded portions of the bolts to be cleaned and stripped of the rust and also serves as a machine for applying nuts to the bolts. It will be further understood that the nuts, when in the socket, have no rotatable movement so that they are compelled to act in conjunction with the screw threaded portion of the bolts to strip and clean the latter and to facilitate this action I preferably steep or coat the nuts and bolts with oil prior to operating upon them as above described.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A reclaiming machine for rusty bolts including a chuck having a cavity adapted to receive and freely hold the head of a bolt; means for optionally rotating said chuck in opposite directions; and a carriage slidably supported to move in opposite directions in alinement with the axis of the bolt within the chuck, said carriage having a socket with a lateral opening and being adapted to hold a nut, inserted therein through said opening, against rotation whereby when the carriage is moved in one direction, the nut will be advanced into engagement with the screw threaded portion of the bolt throughout its length to strip the same of its coating of rust, said chuck then being rotatable in the opposite direction to move the nut and carriage in a direction away from the head of the bolt; substantially as described.

2. A reclaiming machine for rusty bolts including a chuck having a cavity adapted to receive and freely hold the head of a bolt; means for optionally rotating said chuck in opposite directions; a carriage slidably supported to move in opposite directions in alinement with the axis of the bolt within the chuck, said carriage having a socket with a lateral opening and being adapted to hold a nut, freely inserted therein through said opening, against rotation whereby when the carriage is moved in one direction, the nut will be advanced into engagement with the screw threaded portion of the bolt throughout its length to strip the same of its coating of rust; and a treadle connected to said means and movable into one position to effect said advancing movement of the nut by causing said means to rotate in one direction, said treadle being movable into another position to effect a movement of said means in an opposite direction to move said nut and carriage in a direction away from the head of the bolt; substantially as described.

3. A reclaiming machine for rusty bolts including a chuck adapted to receive and hold the head of a bolt; means for optionally rotating said chuck in opposite directions; a carriage slidably movable in opposite directions in alinement with the bolt within the chuck, said carriage having an angular socket into which a nut can be freely inserted and by the angular character of the socket held against rotation whereby when the carriage is moved in one direction, the nut will be advanced into engagement with the screw threaded portion of said bolt throughout its length to strip the same of its coating of rust, said chuck then being rotatable in the opposite direction to move the nut and carriage in a direction away from the head of the bolt; and common means for effecting the operation of said first means to cause said optional rotation of the chuck in opposite directions; substantially as described.

4. A reclaiming machine for rusty bolts including means providing an angular socket into which a nut can be freely inserted and by the angular characteristic of the socket held against rotation relatively to the socket, said means being operative for relatively moving said nut while in the socket toward the screw threaded end of a bolt whereby the nut initially engages said screw threaded end of the bolt; and means for relatively rotating the bolt and said socket portion of said first means in opposite directions whereby the screw threaded portion of the bolt passes through the nut and is thereby stripped of its rust throughout its length, said rotating means then being operative to effect a relative movement between said nut and bolt whereby the screw threaded portion of the bolt is moved longitudinally in the opposite direction relatively to the nut; substantially as described.

In testimony whereof I have signed my name to this specification in the presence of two subscribing witnesses.

EDMUND LOUIS DUNN.

Witnesses:
 CHAS. E. POTTS,
 ANNA RENTON.